US006751367B2

(12) United States Patent
Moslehi et al.

(10) Patent No.: US 6,751,367 B2
(45) Date of Patent: Jun. 15, 2004

(54) MULTIPLEXABLE FIBER-OPTIC STRAIN SENSOR SYSTEM WITH TEMPERATURE COMPENSATION CAPABILITY

(75) Inventors: Behzad Moslehi, Mountain View, CA (US); Vahid Sotoudeh, Los Altos, CA (US); Brian Kutner, Santa Clara, CA (US); Dario G. Falquier, Palo Alto, CA (US); Levy Oblea, Union City, CA (US)

(73) Assignee: IFOS, Inc., Sunnyvale, CA (US)

( * ) Notice: Subject to any disclaimer, the term of this patent is extended or adjusted under 35 U.S.C. 154(b) by 0 days.

(21) Appl. No.: 10/422,146

(22) Filed: Apr. 24, 2003

(65) Prior Publication Data

US 2004/0052444 A1 Mar. 18, 2004

Related U.S. Application Data

(63) Continuation-in-part of application No. 09/286,092, filed on Apr. 2, 1999, now Pat. No. 6,597,822.

(51) Int. Cl.[7] .............................. G02B 6/00; G01B 11/16
(52) U.S. Cl. ................ 385/13; 250/227.14; 250/227.18
(58) Field of Search ................................ 385/10–13, 37; 250/227.14, 227.17–227.19, 227.23; 356/32, 35.5, 72

(56) References Cited

U.S. PATENT DOCUMENTS 6,275,629 B1 * 8/2001 Eggleton et al. .............. 385/37
6,335,524 B1 * 1/2002 Udd et al. ................ 250/227.18

* cited by examiner

Primary Examiner—Frank G. Font
Assistant Examiner—Michael P. Mooney
(74) Attorney, Agent, or Firm—Jay A Chesavage

(57) ABSTRACT

A fiber optic sensor comprises two independent fibers having Bragg gratings which are coupled to commutating broadband optical sources through splitters and wavelength discriminators. The ratio of detected optical energy in each of two detectors examining the wave intensity returned to a wavelength discriminator coupled with the characteristic of the wavelength discriminator determines the wavelength returned by the grating. In another embodiment, tunable filters are utilized to detect minimum returned wave energy to extract a sensor wavelength Reference to the original grating wavelength indicates the application of either temperature or strain to the grating. In another embodiment, a plurality of Bragg grating sensor elements is coupled to sources and controllers wherein a dimensional change in a fiber having a Bragg grating is detected using a measurement system comprising broad-band sources, optical power splitters, a high-sensitivity wavelength discriminator, optical detectors, and a controller.

16 Claims, 15 Drawing Sheets

MULTIPLEXABLE FIBER-OPTIC STRAIN SENSOR SYSTEM WITH TEMPERATURE COMPENSATION CAPABILITY

The present invention is a continuation in part application of U.S. patent application Ser. No. 09/286,092 filed Apr. 2, 1999, now U.S. Pat. No. 6,597,822; issued Jul. 22, 2003.

This invention was made with U.S. Government support under grant NAS 1-20579 awarded by the National Aeronautics and Space Administration. The U.S. Government has certain rights in this invention.

FIELD OF THE INVENTION

The current invention applies to the field of fiber-optic sensors, wherein a dimensional change in a fiber having a Bragg grating is detected using a measurement system comprising broad band sources, optical power splitters, a high-sensitivity wavelength discriminator, optical detectors, and a controller.

BACKGROUND OF THE INVENTION

There are several modern methods for fabricating optical waveguides for the low-loss containment and delivery of optical waves. One such waveguide is optical fiber which slightly higher index of refraction than the surrounding cladding. Typical values for the core diameter are of order 10 $\mu$m for single-mode fiber operating at communications wavelengths of 1300–1550 nm, and 50 $\mu$m or 62.5 $\mu$m for highly multi-mode fiber. Whether single-mode or multi-mode, the cladding diameter has most commonly an overall diameter of 125 $\mu$m, and a plastic jacket diameter is typically 250 $\mu$m for standard telecommunications fiber. The glass core is generally doped with germanium to achieve a slightly higher index of refraction than the surrounding cladding by a factor of roughly 1.003. The jacket is generally plastic and is used to protect the core and cladding elements. It also presents an optically discontinuous interface to the cladding thereby preventing coupling modes in the cladding to other adjacent fibers, and usually plays no significant part in the optical behavior of the individual fiber other than the usually rapid attenuation of cladding modes in comparison with bound core modes.

As described in the book by Snyder and Love entitled "Optical Waveguide Theory" published by Chapman and Hall (London, 1983), under the assumptions of longitudinal invariance and small index differences for which the scalar wave equation is applicable, the modal field magnitudes may be written $$\Psi(r,\phi,z)=\psi(r,\phi)\exp\{i(\beta z-\omega t)\}$$

where $\beta$ is the propagation constant $\omega$ is the angular frequency t is time z is the axial distance r,$\phi$ is the polar trans-axial position along the fiber.

Single-mode fibers support just one order of bound mode known as the fundamental-mode which we denote as $\psi_{01}$, and which is often referred to in the literature as $LP_{01}$. The transverse field dependence for the fundamental-mode in the vicinity of the core may be approximated by a gaussian function as $$\psi_{01}(r,\phi)=\exp\{-(r/r_{01})^2\}$$

where $r_{01}$ is the fundamental-mode spot size.

Optical fiber couplers, also known as power splitters, are well known in the art, and generally comprise two fibers as described above having their jackets removed and bonded together with claddings reduced so as to place the fiber cores in close axial proximity such that energy from the core of one fiber couples into the core of the adjacent fiber. One such coupler is a fused coupler, fabricated by placing two fibers in close proximity, and heating and drawing them. The finished fused coupler has the two cores in close proximity, enabling the coupling of wave energy from one fiber to the other. A further subclass of fused coupler involves a substantially longer coupling length, and is known as a wavelength discriminator. The characteristics of a wavelength discriminator include wavelength-selective coupling from an input port to a first output port, as well as a second output port. As the wavelength is changed over the operating range of the wavelength discriminator, more energy is coupled into the first output port, and less is coupled into the second output port. The operation of a wavelength discriminator is described in "All-fibre grating strain-sensor demodulation technique using a wavelength division coupler" by Davis and Kersey in Electronics Letters, Jan. 6, 1994, Vol. 30 No. 1.

Fiber optic filters are well known in the art, and may be constructed using a combination of optical fiber and gratings. Using fiber of the previously described type, there are several techniques for creating fiber optic gratings. The earliest type of fiber grating-based filters involved gratings external to the fiber core, which were placed in the vicinity of the cladding as described in the publication "A single mode fiber evanescent grating reflector" by Sorin and Shaw in the Journal of Lightwave Technology LT-3:1041–1045 (1985), and in the U.S. patents by Sorin U.S. Pat. No. 4,986,624, Schmadel U.S. Pat. No. 4,268,116, and Ishikawa U.S. Pat. No. 4,622,663. All of these disclose periodic gratings which operate in the evanescent cladding area proximal to the core of the fiber, yet maintain a separation from the core. A second class of filters involve internal gratings fabricated within the optical fiber itself. One technique involves the creation of an in-fiber grating through the introduction of modulations of core refractive index, wherein these modulations are placed along periodic spatial intervals for the duration of the filter. In-core fiber gratings were discovered by Hill et al and published as "Photosensitivity in optical fiber waveguides: Application to reflected filter fabrication" in Applied Physics Letters 32:647–649 (1978). These gratings were written internally by interfering two counter propagating electromagnetic waves within the fiber core, one of which was produced from reflection of the first from the fiber end face. However, in-core gratings remained a curiosity until the work of Meltz et al in the late 1980s, who showed how to write them externally by the split-interferometer method involving side-illumination of the fiber core by two interfering beams produced by a laser as described in the publication "Formation of Bragg gratings in optical fibers by a transverse holographic method" in Optics Letters 14:823–825 (1989). U.S. patents Digiovanni U.S. Pat. No. 5,237,576 and Glenn U.S. Pat. No. 5,048,913, also disclose Bragg gratings, a class of grating for which the grating structure comprises a periodic modulation of the index of refraction over the extent of the grating. Short-period gratings reflect the filtered wavelength into a counter-propagating mode, and, for silica based optical fibers, have refractive index modulations with periodicity on the order of a third of the wavelength being filtered. Long-period gratings have this modulation period much longer than the filtered wavelength, and convert the energy of one mode into another mode propagating in the same direction, i.e., a co-propagating mode, as described in the publication "Efficient mode conversion in telecommunication fibre using externally written gratings" by Hill et al in Electronics Letters 26:1270–1272 (1990). The grating comprises a periodic variation in the index of refraction in the principal axis of the core of the fiber, such variation comprising a modulation on the order of 0.1% of the refractive index of the core, and having a period associated with either short or long-period gratings, as will be described later.

The use of fiber-optics in temperature measurement is disclosed in U.S. Pat. No. 5,015,943 by Mako et al. A laser source is beam split into two fibers, one of which is a sensing fiber exposed to an elevated temperature, and one of which is a reference fiber in an ambient environment. The optical energy from the two fibers is summed together, and an interference pattern results. As the temperature changes, the physical length of the sensing fiber optic cable changes, which causes the interference pattern to modulate. Each modulation cycle represents one wavelength change in length. Counting these interference patterns over time enables the measurement of temperature change.

SUMMARY OF THE INVENTION

The present invention is directed to an apparatus for the measurement of sensor grating pitch, wherein the change in grating pitch can originate from a strain applied to the sensor grating, or it may originate from a temperature change wherein the sensor grating expands or contracts due to the coefficient of thermal expansion of the optical fiber enclosing the sensor grating. A pair of fibers, each having a sensor grating, is illuminated by a pair of broadband sources coupled through a pair of optical power splitters, and this sensor grating reflects wave energy over a narrow optical bandwidth. Reflected wave energy from the narrow-band sensor grating is passed through a wavelength discriminator, comprising a long-drawn optical coupler. A normalized power ratio comprises the difference in first and second detector power levels divided by the sum of the first and second power level. This intensity ratio is compared to the wavelength discriminator characteristic stored in a controller to look up the wavelength from a normalized power ratio value, and hence the pitch of the sensor grating. As the characteristic of the wavelength discriminator is essentially temperature invariant, this very accurately yields the sensor grating pitch. Comparing this reflected wavelength to the known wavelength of the grating indicates a change in wavelength brought about by either a temperature change or by the presence of a strain. In the case where a second sensor is also monitored, one sensor may be used as a reference to monitor the temperature of the second sensor, which is used to measure applied strain. In this manner, the temperature effect of the strain gauge may be cancelled by using the measured result of the reference sensor. Commutating the two sources in separate non-overlapping intervals enables the independent measurement of temperature, or strain, or any combination of the two.

BRIEF DESCRIPTION OF THE DRAWINGS

FIGS. 1b, c, d show the spectral behavior of the prior art grating of FIG. 1a.

FIG. 19b show an alternate 1st splitter for the system of FIG. 19a.

FIG. 19c shows an alternate sine filter for the system of FIG. 19a.

DETAILED DESCRIPTION OF THE INVENTION

Figure 1A:
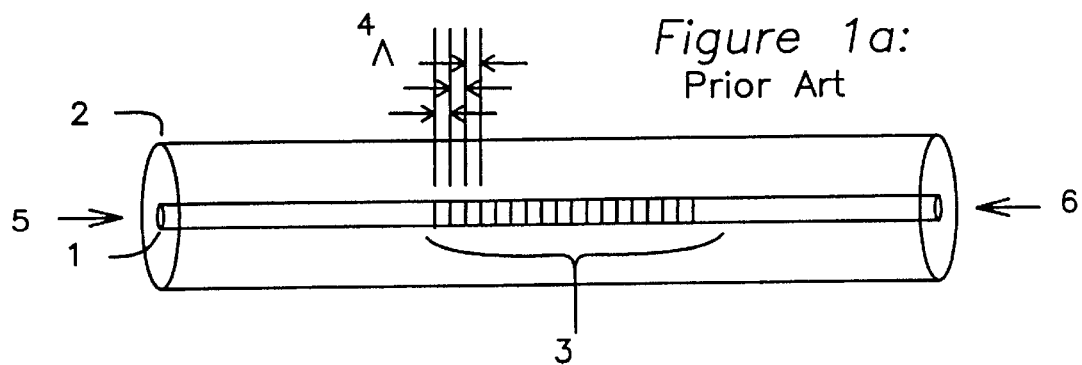
FIG. 1a is a prior art grating.

FIG. 1a shows a prior art internal grating filter, comprising an optical fiber having a core 1, a cladding 2, and a grating 3 fabricated within the extent of the core 1. The grating 3 comprises a modulation of the index of refraction of core 1 having a regular pitch 4, where the grating 3 is used to create short-period grating behavior. For reflection of waves through the grating at wavelength $\lambda_b$, the short-period grating function is as follows:

$$\Lambda_b = \lambda_b/2n$$

where
$\Lambda_b$=pitch of the desired Bragg grating,
$\lambda_b$=conversion wavelength: For short period gratings, $\lambda_b$ is the wavelength for which incident fundamental mode wave energy is converted to counter-propagating (traveling in the opposite direction) wave energy.
n=effective index of refraction of the fiber, which is dependant on the mode of the propagated wave.

Figure 1B:
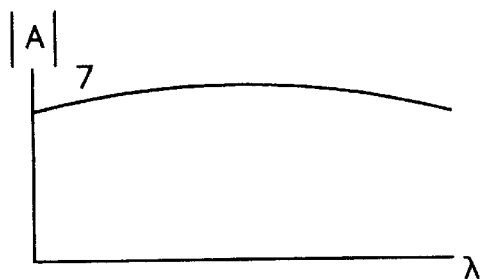
Figure 1C:
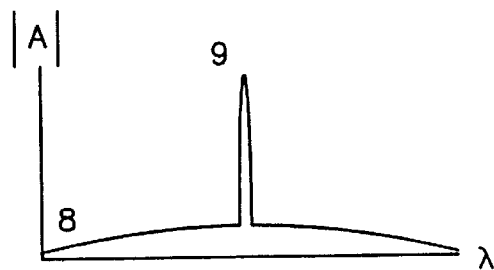
Figure 1D:
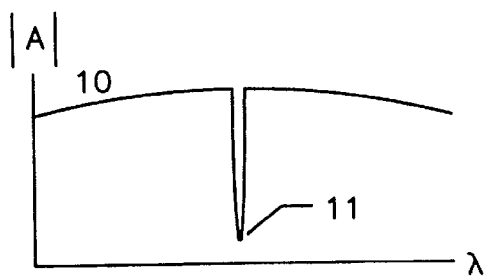

Examining now the transfer curves for a short-period grating 3, FIG. 1b shows the input source spectrum 7 applied to port 5, and FIG. 1c shows the reflected spectrum 8 and grating peak 9 reflected back to port 5. FIG. 1d shows the remaining optical energy continuing to port 6. Filter notch 11 represents wave energy reflected by the short period Bragg grating back to the input port 5, and is represented as spectrum 8 having peak 9 corresponding to the Bragg wavelength. The use of reflected wave energy at peak 9 is generally not available without the use of an optical coupler or some other device sensitive to the propagating direction of this wave.

Figure 1E:
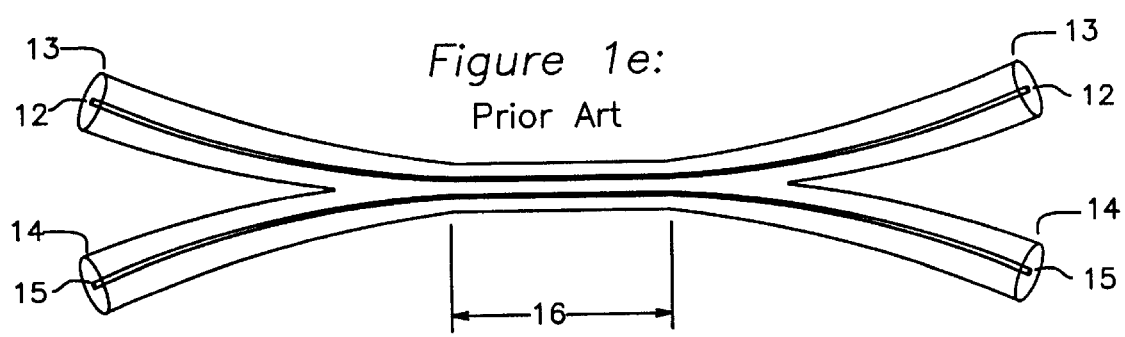
FIG. 1e is a prior art coupler/wavelength discriminator
Figure 1F:
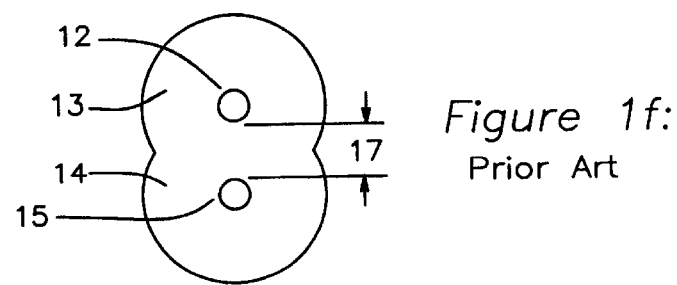
FIG. 1f is a section view of the fused area of FIG. 1e.
Figure 5:
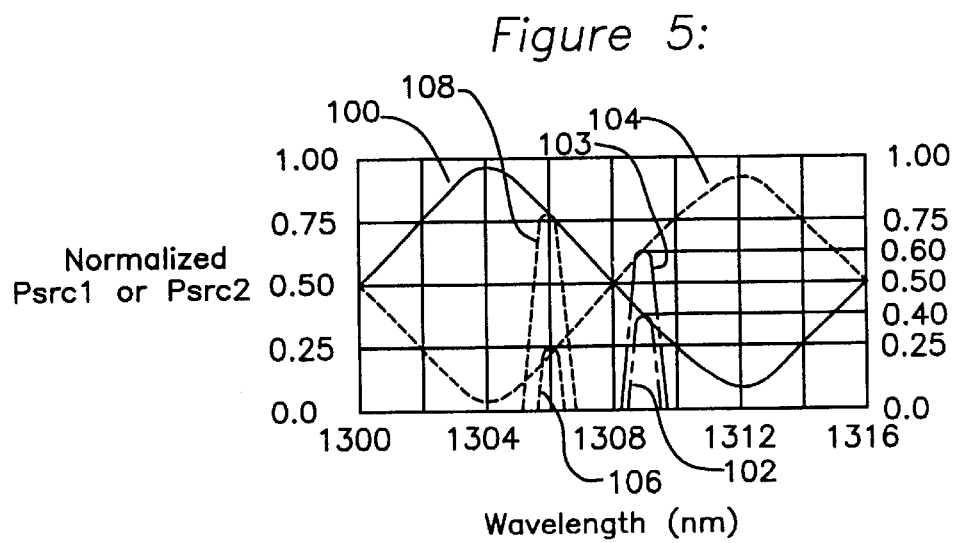
FIG. 5 is a graph of the response of a wavelength discriminator including reflected grating power applied to this wavelength discriminator.

FIG. 1e shows a prior art optical coupler. First fiber having a core 12 and cladding 13 is placed in proximity with a second fiber having a core 15 and a cladding 14. Together, these fibers are heated and drawn to fuse the two fibers into one having a coupling length 16. FIG. 1f shows a section view of this fused middle section. Coupling length 16 and separation 17 determine the coupling characteristics of the coupler. If the coupling length 16 is short, a broadband coupler having a coupling coefficient related to separation 17 is formed. This is the typical construction for power splitter configurations. If the length 16 is many wavelengths long, a narrowband coupler is formed, also known as a wavelength discriminator. The characteristics of a wavelength discriminator are similar to those of a coupler, with an additional wavelength dependence, as shown in FIG. 5, which is described later.

Figure 2:
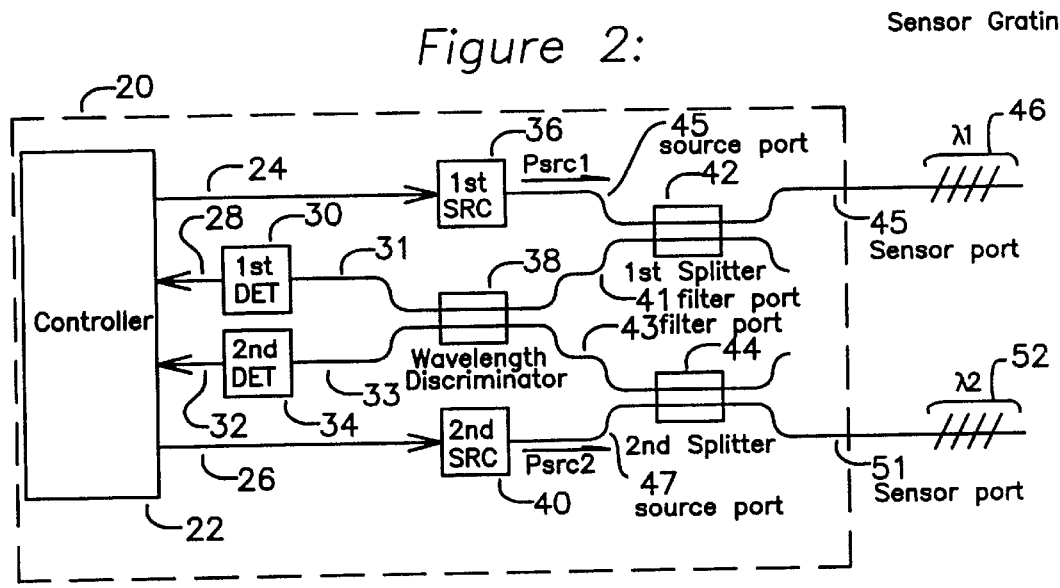
FIG. 2 is a block diagram of the fiber optic sensor system.

FIG. 2 shows the present fiber-optic sensor. Measurement system 20 is coupled to fibers 45 and 51. Each of fibers 45 and 51 has a Bragg grating 46 and 52 respectively. Measurement system 20 further comprises a controller 22 having a first source enable output 24 coupled to first source 36, which may be any source of optical energy having a spectrum which includes the wavelength of the grating 46 on fiber 45. A broadband light-emitting diode (LED) would provide an inexpensive broadband source. Similarly, second source enable output 26 is coupled to second source 40, which has the same requirement of including in its output spectrum the wavelengths of the grating 52 of fiber 51. Broadband sources 36 and 40 respectively couple energy through standard power splitters 42 and 44, which provide optical energy to gratings 46 and 52 respectively. The gratings 46 and 52 may be internal Bragg gratings or external short period gratings. The short-period grating has the property of reflecting optical energy at the grating wavelength back to couplers 42 and 44, where it is split into optical energy provided to cables 41 and 43 to wavelength discriminator 38, the operation of which will be discussed later in FIG. 4. Output wave energy from wavelength discriminator 38 is separated into a first output on fiber 31 travelling to first detector 30, which provides a voltage 28 proportional to the input optical level delivered on fiber 31. Similarly, optical wave energy from the second output 33 of wavelength discriminator 38 is delivered to the second detector 34, which produces a voltage 32 to controller 22 proportional to the input optical level delivered on fiber 33.

Figure 3:
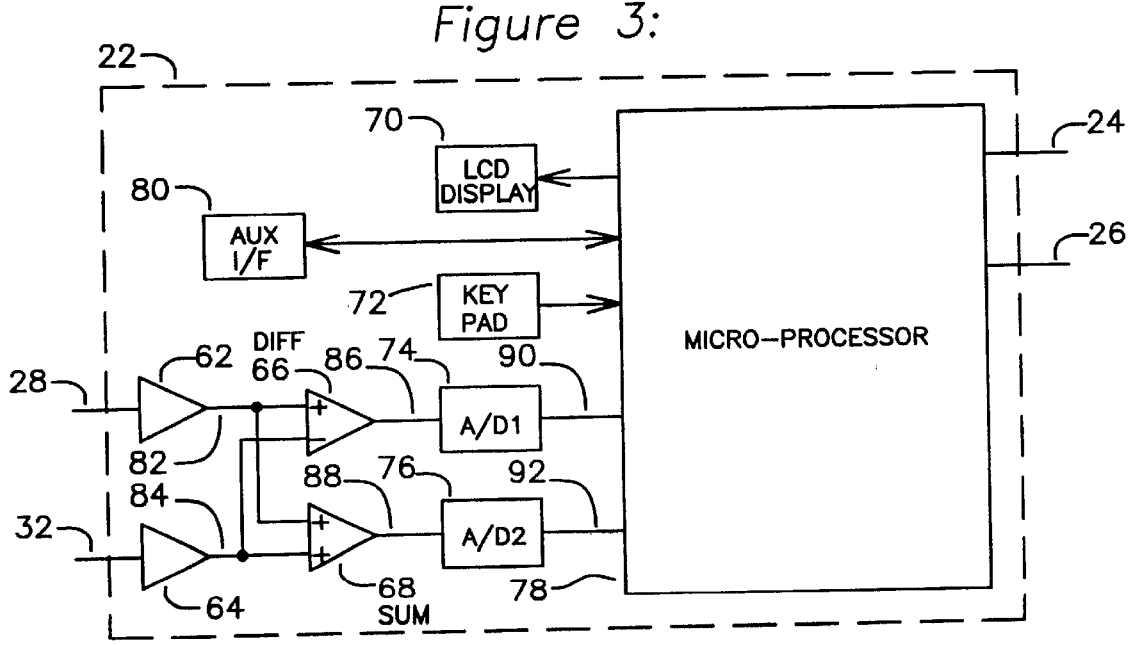
FIG. 3 is a block diagram of the controller of FIG. 2.

FIG. 3 describes in detail the controller 22 of FIG. 2. Controller 22 further comprises a microprocessor 78 which produces first source enable output 24 and second source enable output 26. In addition, first detector input 28 and second detector input 32 are processed by buffer amplifiers 62 and 64 respectively, which isolate the detector element from the following electronics, and produce respectively outputs 82 and 84. These are processed by a difference amplifier 66 to produce a difference output at 86, which is converted from an analog signal to a digital signal by A/D converter 74, delivering a digital representation 90 of this signal to microprocessor 78. Amplifier 68 produces a detector sum output 88, which is similarly converted to a digital signal 92 by A/D converter 76, which is also input to microprocessor 78. A keypad 72 for input and a display 70 are also coupled to the microprocessor 78, as is an auxiliary interface 80. Microprocessor 78 may be chosen from several available units, including the PIC16C71 from Micro-Chip, Inc. of Chandler, Ariz., which has the A/D converters 74 and 76 incorporated internally. As is clear to one skilled in the art, many microprocessor choices are available for 78, including devices with internal or external ROM, RAM, A/D converters, and the like, of which many candidates from the Micro-Chip PIC-16 family would be suitable. While a particular microprocessor is shown for illustrative purposes, it is clear to one skilled in the art that other units could be substituted for these devices without changing the operation of the sensor. The principal requirements of microprocessor 78 are the ability to control the first and second sources, and to process the values provided by the first and second detectors in a manner which determines the wavelength of the sensor grating.

Figure 4:
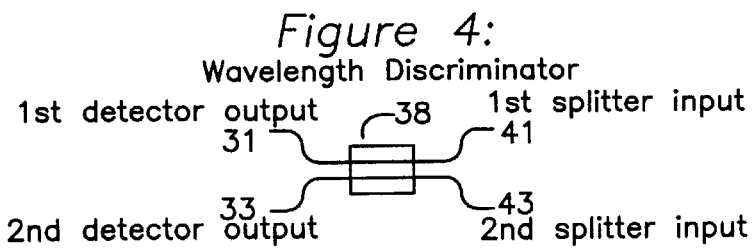
FIG. 4 is a wavelength discriminator.

FIG. 4 shows the wavelength discriminator 38. The wavelength discriminator has a first splitter input port 41, a second splitter input port 43, a first detector output port 31, and a second detector output port 33. FIG. 5 shows the normalized output of wavelength discriminator 38 for the case where a swept-wavelength input is applied to first splitter input 41, and no input is provided to second splitter input 43. Curve 100 shows the output level of first detector output 31, while curve 104 shows the output level of second detector output 33. As can be seen from the graph, as the wavelength is varied from 1300 nm to 1316 nm, the first detector and second detector outputs vary in a complimentary manner, such that the sum of the first detector output and second detector output is nearly constant. The wavelength discriminator is a symmetric device, so if no optical signal were applied to first input 41 and a swept wavelength optical signal were applied to second input 43, curve 100 would show the level of second output port 33, while curve 104 would show the level of first output port 31.

Figure 6:
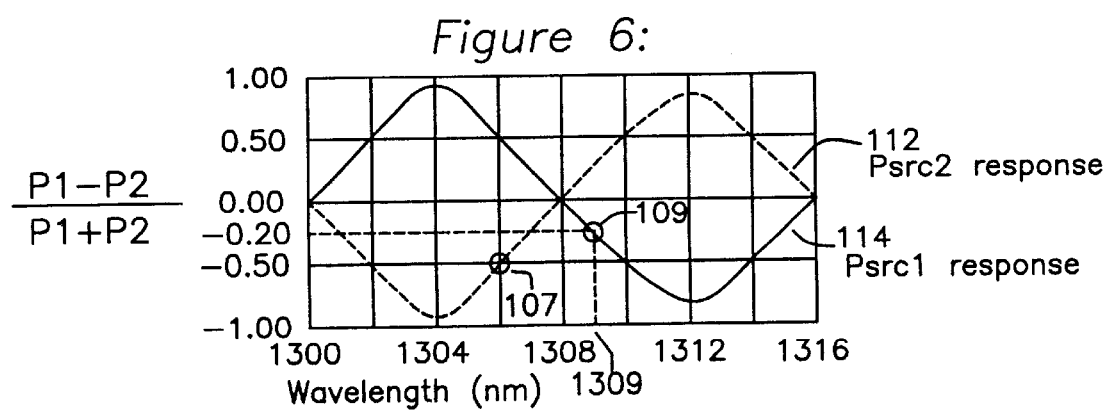
FIG. 6 is a graph of the output function of the wavelength discriminator normalized power ratio (P1−P2)/(P1+P2).

FIG. 6 shows a plot for normalized power ratio derived from first output curve 100 and second output curve 104. If these two complimentary curves 100 and 104 are plotted as (P1−P2)/(P1+P2), then the plot of FIG. 6 results, and we may now determine wavelength over monotonic regions such as from 1304 nm to 1312 nm by simply looking up the wavelength given the (P1−P2)/(P1+P2) normalized power ratio. Curve 114 represents the response to first source 36, and curve 112 represents the response to second source 40. The advantage of performing this lookup in this ratiometric manner of FIG. 6 as opposed to the absolute output level on the curve 100 of FIG. 5 is that variations in source power are normalized out of the result. Specifically, changes in the output power of sources 36 and 40 would modulate the values shown in plots 100 and 104 of FIG. 5, but not the normalized power ratio shown in the plot of FIG. 6.

Further examining the operation of the measurement system of FIG. 2, the first measurement is performed with only first source 36 enabled. Optical energy travels through first coupler 42 to fiber 45, and to grating 46. Optical energy at the wavelength $\lambda_1$ of grating 46 is reflected through fiber 45 back to first coupler 42, through fiber 41, where it is presented to wavelength discriminator 38. No input is present on fiber 43 because second source 40 is not enabled. Optical energy from grating 46 is reflected, for example, at $\lambda_1$=1309 nm, as shown in curve 102 of FIG. 5, and 0.4 volts is generated at 28 by first detector 30. The second output 33 of wavelength discriminator 38 is applied to the second detector 34, producing 0.6 volts at 32 as shown in curve 103 of FIG. 5. By now finding the normalized power ratio of (0.4−0.6)/(0.4+0.6)=−20, it can be seen that this corresponds to 1309 nm wavelength on curve 114 at point 109 in FIG. 6.

An entirely separate measurement can be made by disabling first source 36 and enabling second source 40. In this case, optical energy would leave second splitter 44 through fiber 51 to grating 52. Optical energy at wavelength $\lambda_2$ 52 would be returned to second splitter 44 through fiber-optic cable 51, leave second splitter 44 through fiber-optic cable 43, entering wavelength discriminator 38. Analogous to the earlier described processing, first source 36 would be disabled, hence no optical energy would be present in fiber 41. In the case of wave energy input to fiber 43 instead of fiber 41, the output characteristic of FIG. 5 would be reversed such that curve 100 would be the output energy on fiber 33, and curve 104 would represent the output energy of fiber 31. If the grating 52 were reflecting at $\lambda_2$=1306 nm, then second detector 34 would produce 0.75 volts as shown in curve 108 of FIG. 5. First detector 30 would produce 0.25 volts as shown in curve 106 of FIG. 5. The normalized power ratio of FIG. 6 would be (0.25−0.75)/(0.25+0.75)=−0.5, corresponding to 1306 nm on curve 112 of FIG. 6 at point 107.

Figure 7:
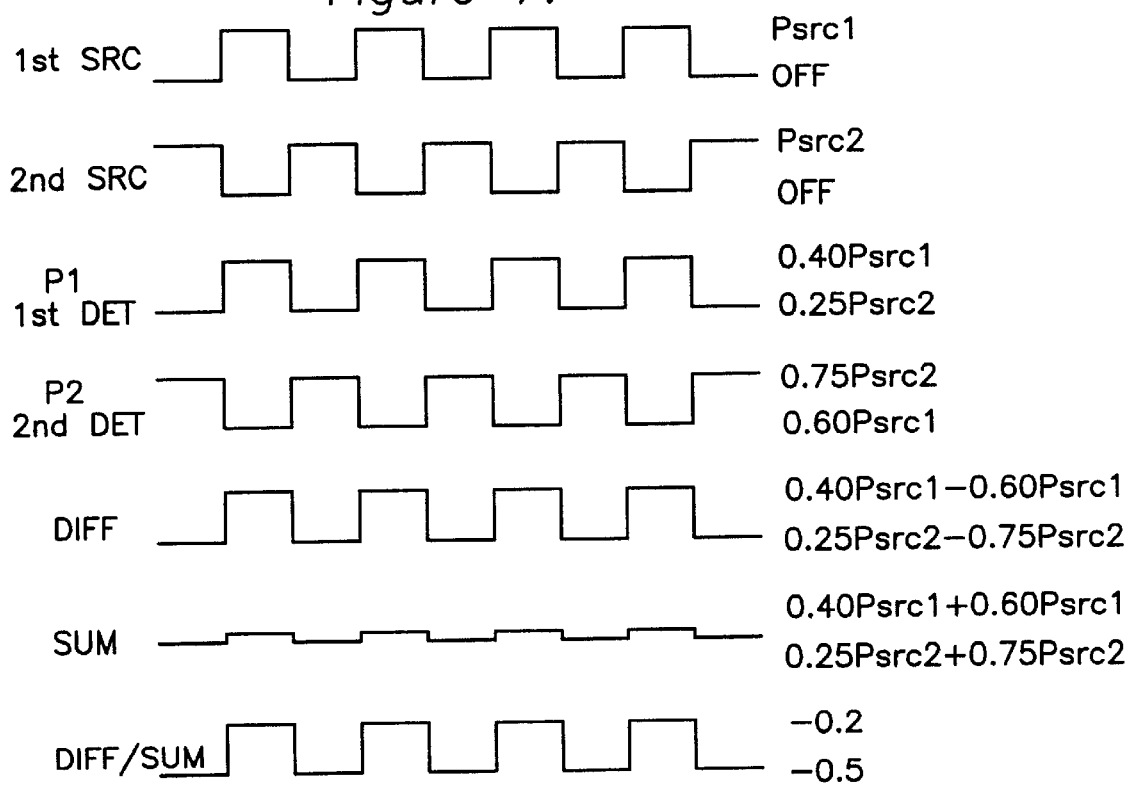
FIG. 7 is the dynamic state of various internal nodes of the fiber optic sensor system during operation.

FIG. 7 shows the sensor measurement system operating in the earlier-described case where the wavelength of first sensor 46 is $\lambda_1$=1309 nm and the wavelength of second sensor 52 is $\lambda_2$=1306 nm. First, the detector offsets are determined by turning both first source 36 and second source 34 off. This produces the detector offset values OS1 and OS2, which will be necessary to subtract from the power difference and power sum before calculation of the normalized power ratio (P1−P2)/(P1+P2). Thereafter, first source 36 and second source 40 are alternately enabled as shown in FIG. 7. First detector 30 and second detector 34 produce the P1 and P2 values shown, and the difference, sum, and the normalized power ratio value of difference/sum are computed as shown, wherein the power difference (P1−P2) and the sum (P1+P2) represent power quantities after removal of offsets OS1 and OS2, which thereafter form the normalized power ratio (P1−P2)/(P1+P2). If the plot of FIG. 6 normalized power ratio were kept in the memory of the microprocessor, either as a series of interpolated points, or as a power series wherein only the coefficients f0, f1, f2, f3 ... fn of a polynomial are stored, and the power $$\lambda(P1, P2) = f_0 + f_1\left[\frac{P1-P2}{P1+P2}\right] + f_2\left[\frac{P1-P2}{P1+P2}\right]^2 + f_3\left[\frac{P1-P2}{P1+P2}\right]^3 + \ldots + f_n\left[\frac{P1-P2}{P1+P2}\right]^n \text{ series is of the form}$$

where $\lambda(P1,P2)$=wavelength as a function of detector power ratio (P1−P2)/(P1+P2).

It would be possible to convert the given normalized power ratio(P1−P2)/(P1+P2) back to a wavelength $\lambda_1$=1309 nm for the first sensor, and $\lambda_2$=1306 nm for the second sensor. This determination could be done using either a look-up table derived from the normalized power ratio, or by storing the coefficients of a power series based on the normalized power ratio, and thereafter calculating for wavelength based on this power series.

If the sensors were operating either as temperature sensors or strain sensors, the applied strain or temperature could be computed from the following relationship:

$$\Delta\lambda = \alpha 1 \Delta T + \alpha 2 \Delta S$$

where $\Delta\lambda$=change in sensor wavelength
$\alpha 1$=coefficient of thermal change for sensor
$\Delta T$=change in sensor temperature
$\alpha 2$=coefficient of strain change for sensor
$\Delta S$=change in sensor strain In this equation, the change in sensor wavelength is expressed as the sum of a temperature related change and a strain related change. The coefficients $\alpha 1$ and $\alpha 1$ would be stored in the controller along with initial condition values to solve for total strain and total temperature. In this manner, any combinations of strain and temperature could be determined given a change in sensor wavelength and the wavelength discriminator characteristic curve, and first and second detector inputs.

Figure 8:
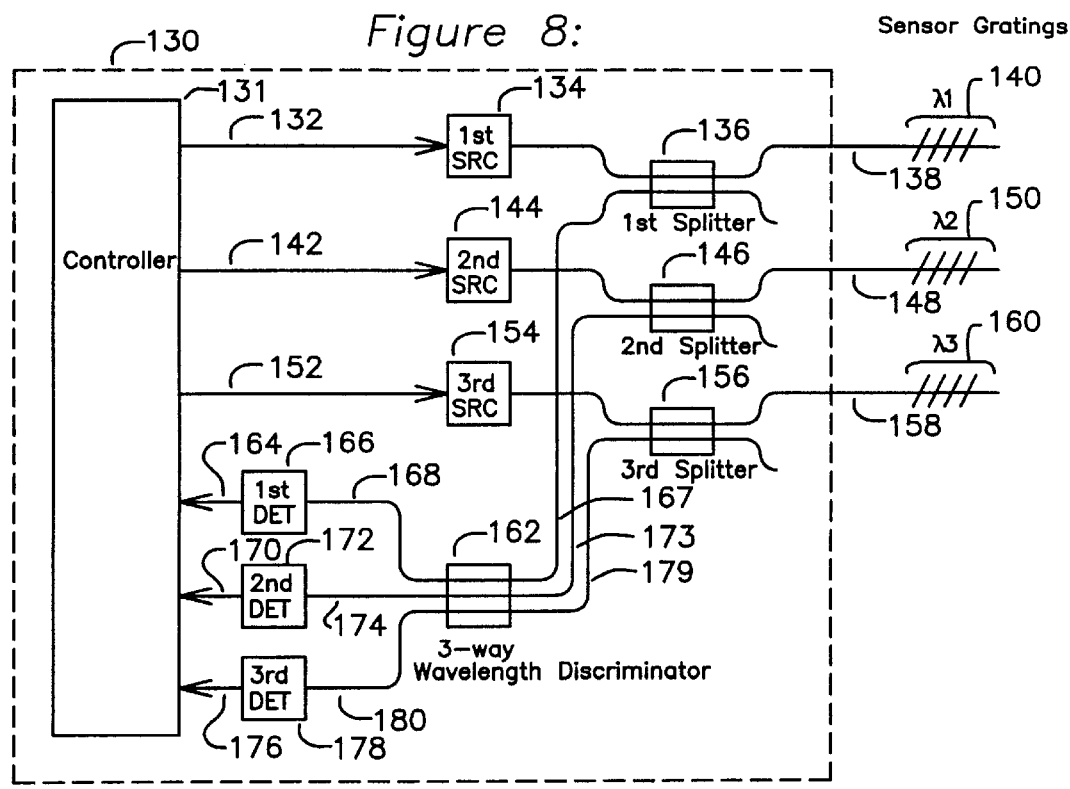
FIG. 8 is a three-wavelength, temperature/strain sensor.
Figure 9:
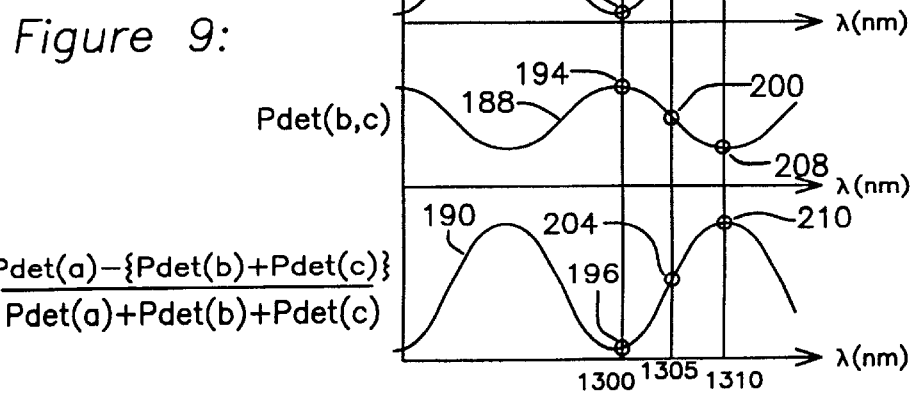
FIG. 9 shows the wavelength detection properties of FIG. 8.

FIG. 8 shows a strain/temperature measurement system having a 3-way wavelength discriminator 162. This system is analogous to the system described in FIG. 2, however, for an n-way wavelength discriminator, the output port associated with the excited port has the response shown in plot 186, while the remaining ports have the characteristic shown in plot 188. For example, in the case of FIG. 8, first source 134 sends broadband excitation through first splitter 136, and wave energy at the example grating wavelength $\lambda_1$=1300 nm is reflected through splitter 136 to wavelength discriminator port 167. For this case, the output at port 168 has the characteristic shown in plot 186, while the second output 174 and third output 180 have the responses shown by curve 188. For $\lambda_1$=1300 nm, the response of the first detector is shown as point 192, while the second the third detectors have the response shown by point 194. As before, a normalized plot of the response of curves 186 and 188 is shown in plot 190. For the case of an n-way wavelength discriminator, the output curve 190 would be $$P(normalized) = \left[\frac{P\,det(a) - \{P\,det(b) + P\,det(c) \ldots + P\,det(n)\}}{P\,det(a) + \{P\,det(b) + P\,det(c) \ldots + P\,det(n)\}}\right]$$

Where

Pdet(a)=output power from excited channel
Pdet(b) through Pdet(n)=output power from non-excited channel.

A lookup table constructed from the values of curve 190 would produce the value for $\lambda_1$=1300 nm as shown at point 196. Similarly, when second source 144 excites grating 150, wave energy at the exemplar wavelength $\lambda_2$=1305 nm would return through splitter 146, fiber 173, and now fiber 174 would contain the response shown in plot 186. Fibers 168 and 180 would contain wave energy shown in plot 188, corresponding to point 200. The normalized power ratio for $\lambda_2$=1305 nm is represented by point 204 of the plot 190. The case where third source 154 excites grating 160 is shown in third detector response 186, and first and second detector responses 188. For the case where third grating wavelength is 1310 nm, the responses of the third detector, first and second detectors, and normalized power ratio are shown in points 206, 208, and 210. It is clear to one skilled in the art that this system is extendable to n ports of measurement, where each port has a source, a splitter, and each splitter port is connected to an input port of an n-way wavelength discriminator. Each output port of the n-way wavelength discriminator is coupled to a detector, and the response of each detector is measured, and the normalized power ratio is formed from the ratio of the difference between the response of an excited port and the responses of all of the non-excited ports, divided by the sum of all of the responses of excited and non-excited ports.

Figure 10:
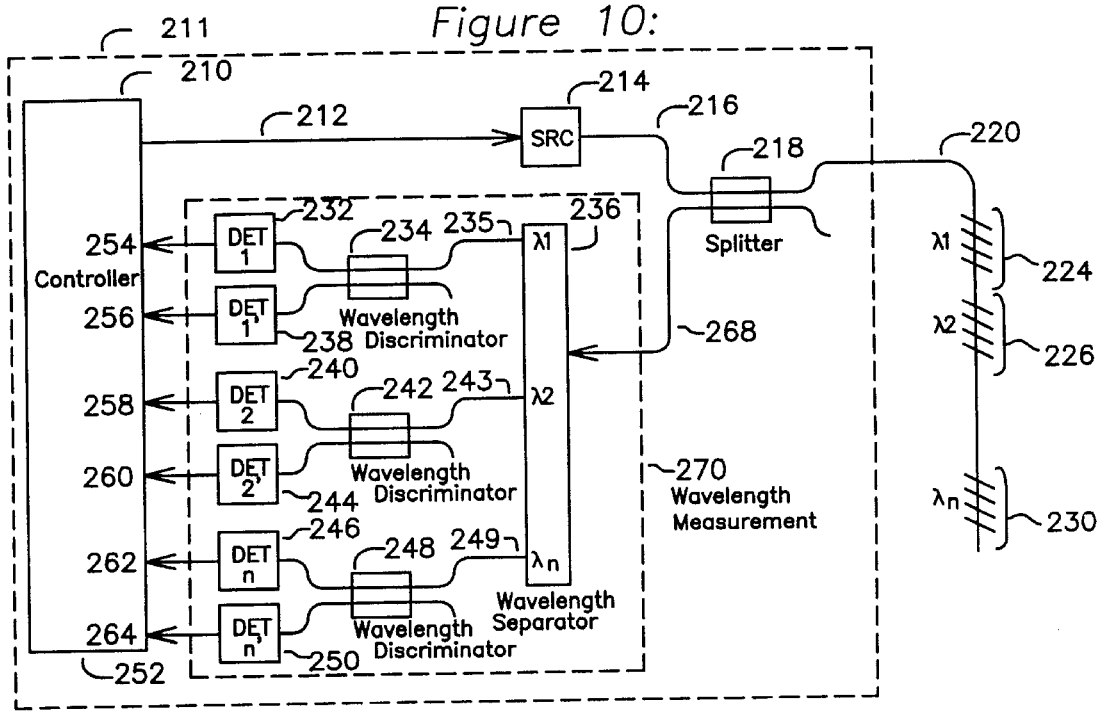
FIG. 10 is a multi-wavelength strain/temperature measurement system.

FIG. 10 shows a strain/temperature sensor system 211 attached to a fiber 220 comprising a plurality of gratings 224, 226, and 230. These sensors operate as earlier described, but are sequentially applied to various parts of a fiber 220. Each sensor 224, 226, and 230 reflects wave energy at respective unique wavelengths $\lambda_1$, $\lambda_2$, and $\lambda_n$. Since gratings 224 and 226 have no effect on out-of-band waves at $\lambda_n$, splitter 218 delivers to fiber 268 the superposition of reflected unique wavelengths $\lambda_1$ through $\lambda_n$. Wavelength separator 236 has broadband outputs which respond only to the range of reflected wavelengths for that given output. For example, output 235 is responsive only to the range of $\lambda_1$, and output 243 is only responsive to the range of $\lambda_2$, and output 249 is only responsive to the range of $\lambda_n$. This requires that the sensor wavelengths and wavelength separator characteristics be chosen such that isolated response of a given wavelength separator to a given sensor grating wavelength occur. In this manner, output 235 represents exclusively the range of wavelengths of sensor 224, output 243 represents exclusively the range of wavelengths of sensor 226, and output 249 represents exclusively the range of wavelengths of sensor 230. The conversion of the outputs of separator 236 into a detected wavelength occurs as was earlier described in FIGS. 4, 5, and 6. In this manner, multiple sensors can share a single fiber, as long as each produces a unique wavelength.

Figure 11:
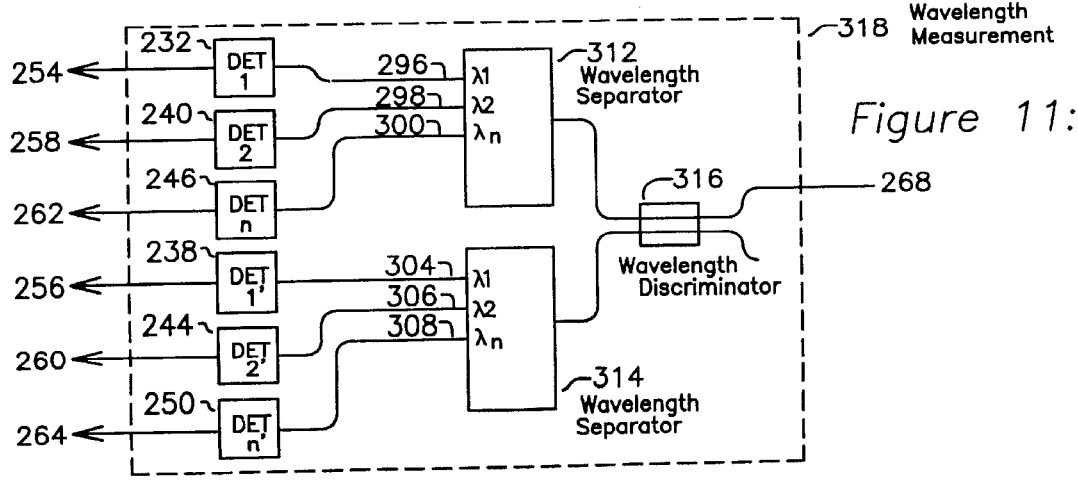
FIG. 11 is an alternate wavelength detector for FIG. 10.

An alternate wavelength measurement apparatus 318 is shown in FIG. 11, which performs the same function as 270 of FIG. 10. While the wavelength measurement apparatus 270 uses a wavelength separator 236 followed by narrow-band wavelength discriminators 234, 242, and 248, the wavelength measurement apparatus 318 of FIG. 11 utilizes a broadband wavelength discriminator 316 followed by wavelength separators 312 and 314. These produce complimentary outputs 296 and 304 for $\lambda_1$, complimentary outputs 298 and 306 for $\lambda_2$, and complimentary outputs 300 and 308 for $\lambda_n$. Detectors 232, 240, 246, 238, 244, and 250 operate in a manner identical to those of FIG. 10.

Figure 12:
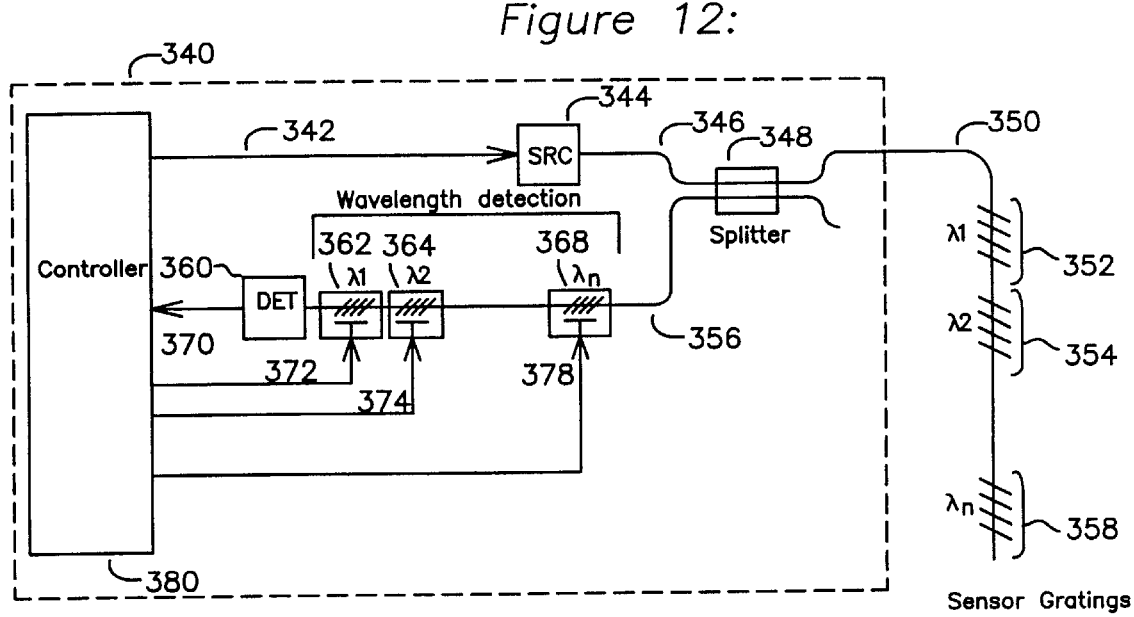
FIG. 12 is a multi-wavelength strain/temperature measurement system using tunable gratings.

FIG. 12 shows a measurement system 340 connected to fiber 350, which has a series of sensors 352, 354, and 358, which operate the same as those described earlier in FIG. 10. A single broadband source excites fiber 350 through splitter 348. Splitter 348 returns aggregate reflected waves from sensors 352, 354, and 358 on fiber 356. A series of tunable filters 362, 364, and 368 is coupled to detector 360. Each of these filters is tuned over a narrow range through the application of a control voltage 372, 374, and 378. In operation, filters 364 and 368 have a voltage applied which reflects wave energy out of the range reflected by the sensors 354 and 358, enabling the passage of waves reflected by sensor 352 to pass through and on to tunable filter 362. Tunable filter 362 is swept over its tuning range, and produces a minimum output at detector 360 at the point where the grating 352 matches the tuned filter 362. Controller 380 has the characteristic of tunable filter 362 stored in memory such that the voltage 372 producing a minimum detected output 370 enables the extraction of corresponding wavelength for $\lambda_1$. Next, tunable filters 362 and 368 are tuned out of the band of grating 352 and 358, and tunable filter 364 is swept over its range until a detector minimum is found. As earlier, this minimum voltage corresponds to the wavelength $\lambda_2$. This process continues for as many sensor gratings and tunable filters that are present in the system. In practice, there are many ways of fabricating tunable gratings, including the application of a material with an index of refraction which varies with an applied voltage, the application of a tensile force to a fiber having a grating, or the application of a magnetic field to a grating in close proximity to a material having an index of refraction which changes with an applied magnetic field. It should be clear to one skilled in the art that there are many different ways of practicing such tunable filters, wherein an applied control voltage changes the wavelength of reflection of the tunable filter.

Figure 13:
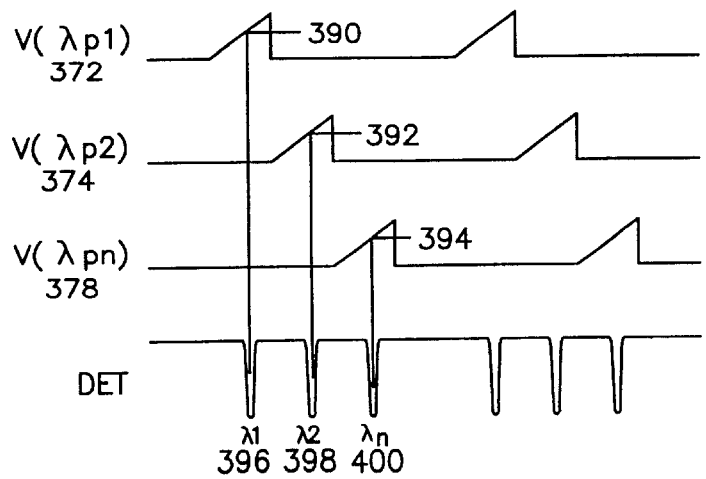
FIG. 13 shows the voltage waveforms for FIG. 12.

FIG. 13 shows the waveforms for the system of FIG. 12. Tunable filter control voltage points 390, 392, and 394 correspond to the detector minima 396, 398, and 400 shown, and therefore enable the recovery of sensor wavelengths $\lambda_1$, $\lambda_2$, and $\lambda_n$.

While the foregoing description is drawn to specific implementations, it is clear to one skilled in the art that other embodiments are available. For example, the earlier described functions SUM and DIFF, which relate to the normalized power ratio, could be implemented using operational amplifiers computing these measurements as analog values, or they could be implemented digitally, operating on digitized detector values, These converters could be either integral to the microprocessor, or external, and the sum and difference values could either be computed through direct reading of the values of the detectors, or through reading sum and difference voltages of alternate circuitry. While the multiple sensor system of FIGS. 10 and 12 are drawn to a 3 sensor system, it is clear to one skilled in the art that these could be drawn to arbitrary numbers of channels operating as strain sensors, temperature sensors, or both. There are also many ways of extracting sensor wavelength from the systems described. For clarity, time division processing has been shown, wherein at a particular time, only a single channel of the system is active, and only one particular wavelength value is recovered. In addition to the explicitly described method of time division processing, there are many modulation schemes wherein each of the sensor values is modulated in frequency or amplitude, and later demodulated to recover the desired value. In this manner, all of the channels of the system could operate simultaneously, rather than sequentially. The use of specific examples for illustration and understanding of the operation of the system does not imply an exclusive manner in which these systems could be implemented.

Figure 14:
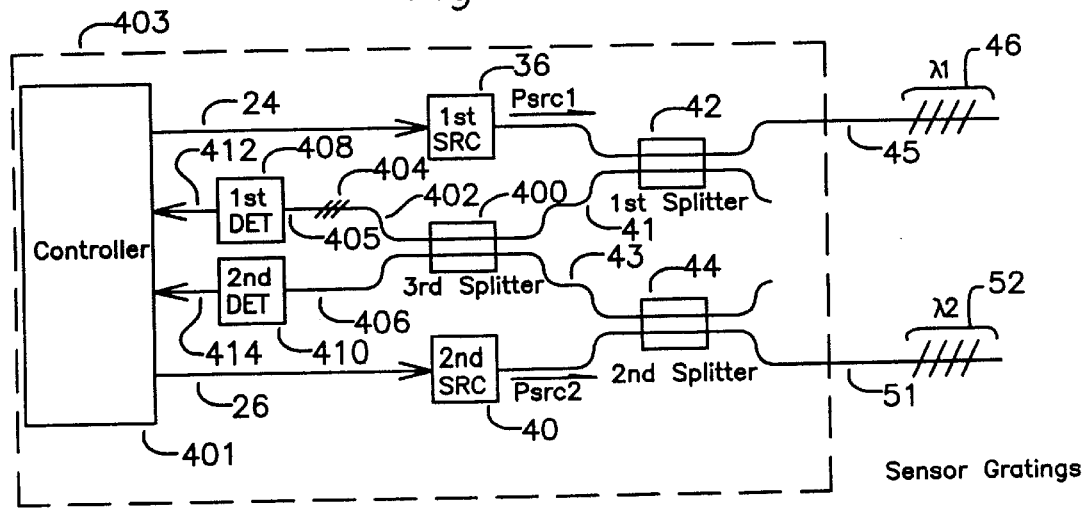
FIG. 14 shows a temperature/strain measurement system having an alternate wavelength discriminator comprising a broadband grating and a splitter.

FIG. 14 shows a strain/temperature measurement system 20 similar to that of FIG. 2, but with a different wavelength discriminator. In the alternate embodiment of FIG. 14, the elements having the same numbering as those of FIG. 2 perform the same function as earlier described, but the wavelength discriminator now comprises third splitter 400 which has as inputs the previously described fibers 41 and 43, and has a normalizing output 406 which is wavelength-invariant compared to wavelength determining output 405. The wavelength-determining output 405 is formed from broad-bandwidth grating 404, which has an output amplitude varying with wavelength over the tuning range of the sensor gratings, as will be described later. First detector 408 and second detector 410 accept optical inputs 405 and 406, respectively, and produce electrical outputs 412 and 414 which are proportional to the respective optical inputs 405 and 406.

Figure 15:
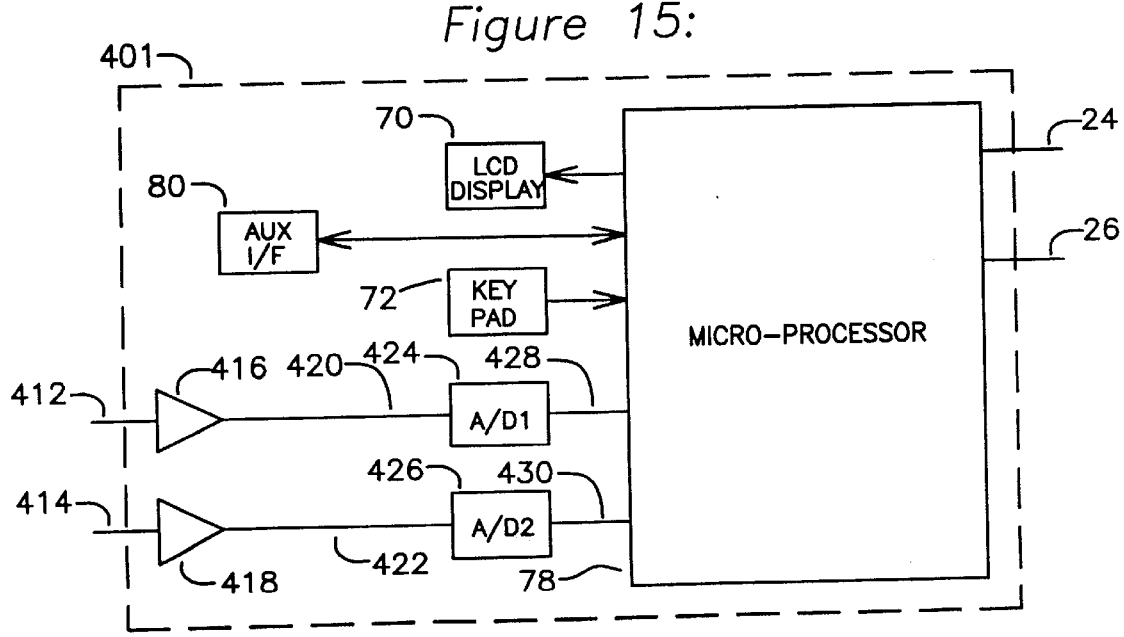
FIG. 15 shows the block diagram of the measurement controller of FIG. 14.

FIG. 15 shows the controller 401 of FIG. 14, which is similar to the controller of FIG. 3, and has similarly-functioning elements numbered the same as those of FIG. 3, as was described earlier. First detector output 412 drives buffer 416 and produces output 420, which is digitized by analog-digital converter 424 and is presented as a digital input 428 to microprocessor 78. Second detector output 414 drives buffer 418 to produce signal 422 which is converted to a digital input 430 by analog-digital converter 426 and delivered to microprocessor 78.

Figure 16:
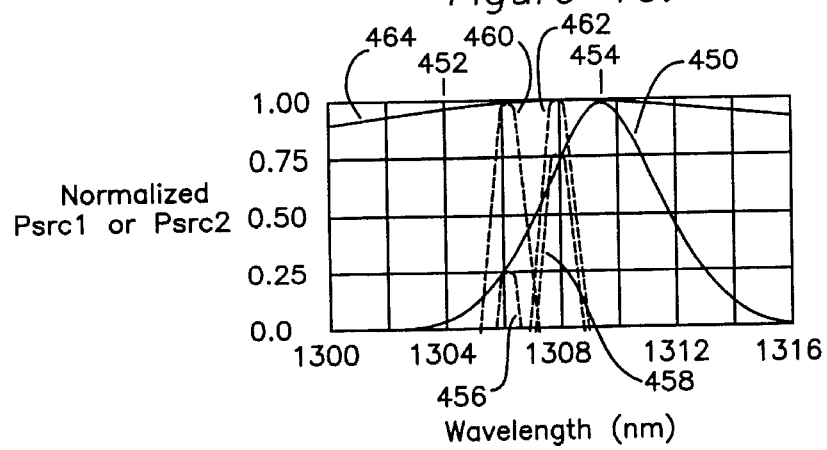
FIG. 16 shows the input to the first and second detectors versus wavelength for the measurement system of FIG. 14.

FIG. 16 shows the characteristic response of the wavelength discriminator having a normalizing input 406, represented by response curve 464, and wavelength-determining input 405, represented by response curve 450. As the reflected wave from grating 46 or grating 52 passes through third splitter 400, equal amounts of energy are presented into grating 404, and to normalizing input 406. As the wavelength applied to third splitter 400 is varied, normalizing output 406 follows the response of curve 464, while the wavelength-determining input 405 follows the response of curve 450, in accordance with the characteristic response of broadly tuned grating 404, whose characteristics are chosen to include a monotonic region from first discrimination wavelength 452 to final discrimination wavelength 454. In the case where grating 46 is reflecting a wavelength of 1306 nm, curve 460 represents the spectral energy of reflected energy from grating 46, which is applied to curve 460 to produce an output of approximately 1.0 units. This same reflected response 456applied to grating 404 having the response of curve 450 and produces an output of approximately 0.25 units. As can be seen from FIG. 16, as long as the range of input wavelength is between first discrimination wavelength 452 and final discrimination wavelength 454, it is possible to recover the wavelength from curve 450. By using the ratio of response 450 to response 464, the effect of intensity variations in first source 36 and second source 40 is removed, as was discussed for the system of FIG. 2. By keeping a copy of the characteristic curve of this normalized function of curve 450 divided by curve 464 in the microprocessor 78, it is possible to resolve any input wavelength in the range first discrimination wavelength 452 to final discrimination wavelength 454 when given the first detector output 412 and second detector output 414. As described earlier, this determination can be made by storing the response of curves 450 and 452 in a look-up table, or by specifying the curve as the coefficients of a polynomial, or in many other ways, all of which form representations of the characteristic curves of 450 or the ratio of curve 450 divided by curve 452.

Figure 17:
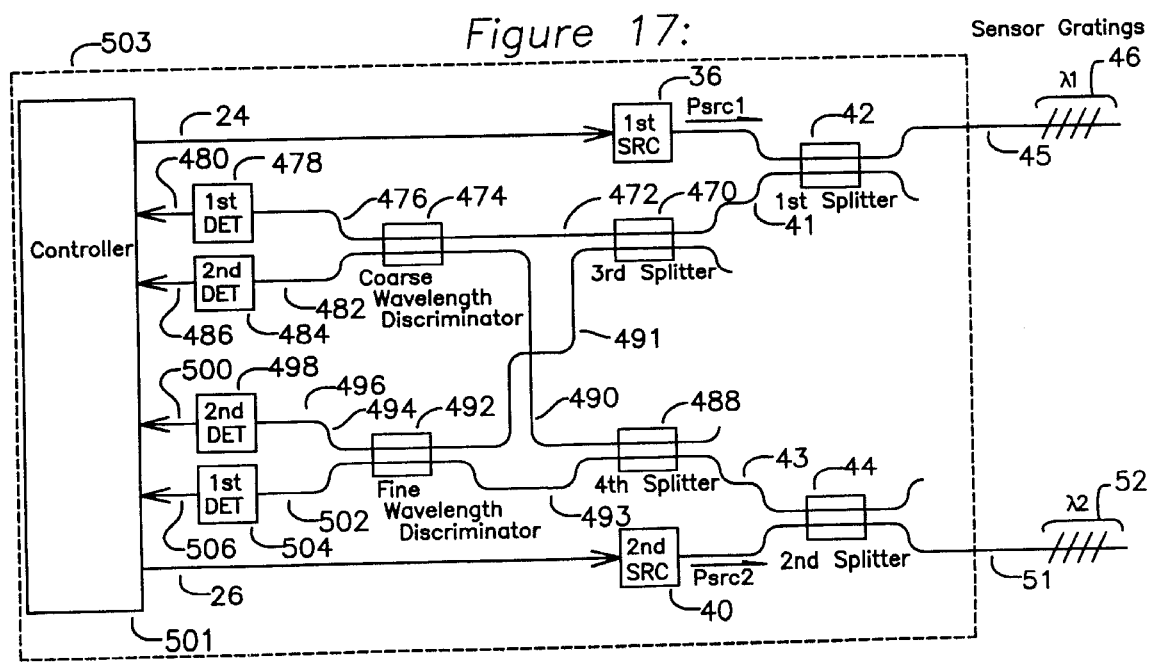
FIG. 17 shows a temperature/strain measurement system using a wavelength discriminator comprising a coarse wavelength discriminator and a fine wavelength discriminator.

FIG. 17 shows another embodiment 503 of a temperature/strain sensor comprising the old elements of FIG. 2 with a new wavelength discriminator circuit. This new wavelength discriminator comprises third splitter 470, fourth splitter 488, a coarse wavelength discriminator 474, and a fine wavelength discriminator 492, coarse wavelength first and second detectors 478 and 484, and fine wavelength discriminator first and second detectors 504 and 498. The operation of the coarse wavelength discriminator comprising coarse wavelength discriminator 474, first detector 478, and second detector 484 is similar to that described in FIGS. 4, 5, and 6, and has a usable wavelength range matched to that of the sensor grating operating range. However, in addition to the coarse wavelength discriminator, a fine wavelength discriminator comprising fine wavelength discriminator 492, and first detector 504 and second detector 498 are used. Third splitter 470 and fourth splitter 488 produce the signals for simultaneous delivery to the coarse and fine wavelength discriminators, as all 4 detectors are used simultaneously, although as described earlier, the first source 36 and second source 40 operate during different intervals, or have orthogonal modulation functions which enable the discrimination of the two detector outputs through the use of a modulation function applied to the sources and a demodulation function applied to the detectors.

Figure 18:
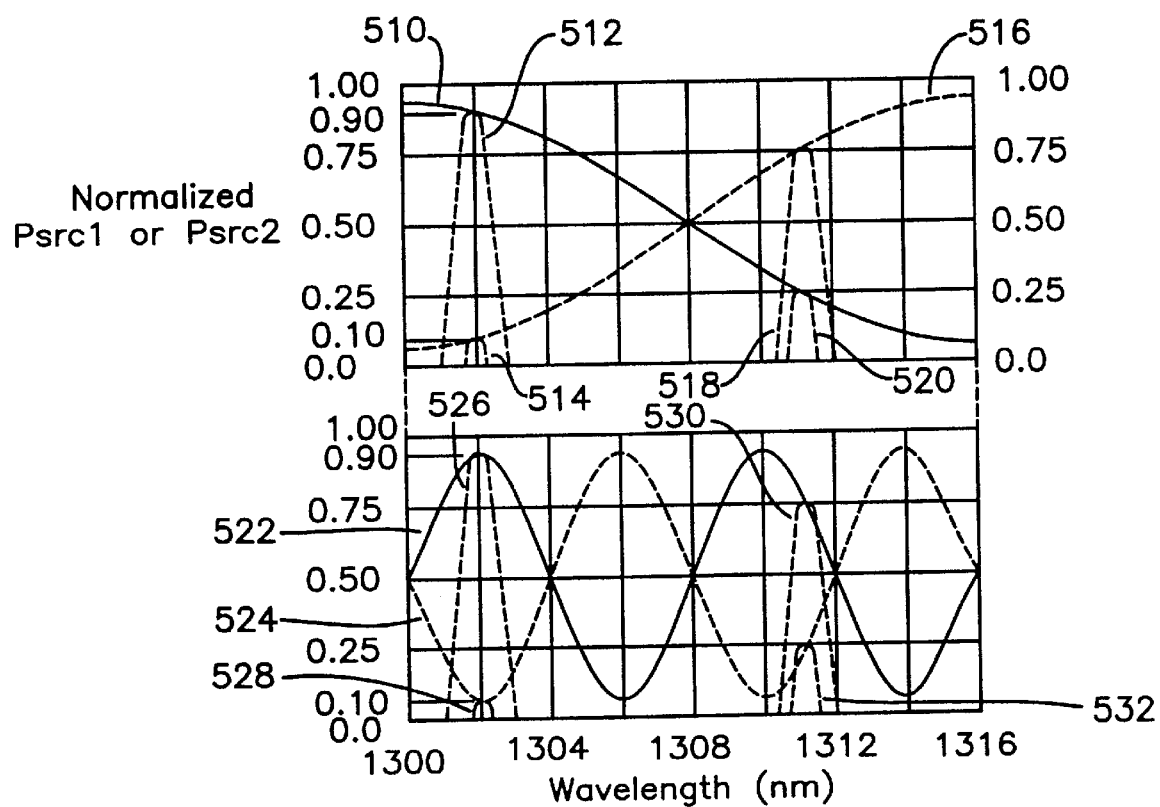
FIG. 18 shows the characteristic transfer function for the fine wavelength discriminator and the coarse wavelength discriminator of FIG. 17.

FIG. 18 shows the details of the fine and coarse wavelength discriminators. Curves 516 and 510 represent the optical response of the wavelength discriminator, as measured at fibers 476 and 482, as well as the detected electrical responses of 480 and 486 to changes in wavelength of sensor 46 or 52, all of which function as earlier described in the system of FIG. 2. For the case of sensor 46 reflecting optical energy at 1302 nm, fiber 472 carries optical wave energy which is provided to coarse wavelength discriminator 474. First output optical fiber 476 carries the energy of curve 512, while second output optical fiber 482 carries the energy of curve 514. Fine wavelength discriminator 492 has many more cycles in the same monotonic range of coarse wavelength discriminator 474, as is seen by the periodicity of curves 510 and 516 of the coarse wavelength discriminator, compared to curves 522 and 524 of the fine wavelength discriminator. The monotonic curve of 510 and 516 is necessary over the tuning range of the reflecting gratings 46 and 52 to ensure single-wavelength resolution. The multiple cycles of discriminator 522 and 524 enable the more precise measurement of wavelength when used in combination with the coarse wavelength discriminator 474. Fine wavelength discriminator is fed by fiber 491, and has a first output 502 which carries the energy of curve 522 and a second output 496 which carries the energy of curve 524 when excited by the signal of fiber 491. When the input signal is provided by fiber 493, the characteristic of the first and second outputs reverse, as was described earlier in FIGS. 4, 5, and 6. In this manner, sensor 46 reflecting a 1302 nm wavelength produces a first coarse detector response of 512, a second coarse detector response of 514, a first fine detector response of 526, and a second fine detector response of 528. Sensor 52 reflecting a wavelength of 1311 nm produces a first coarse detector response of 518, a second coarse detector response of 520, a first fine detector response of 532, and a second fine detector response of 530. As is clear to one skilled in the art, any combination of curve storage methods for maintaining the characteristic curves of 510, 516, 522, and 524 or the difference divided by the sum of curves 510 to 516, or curves 522 and 524 could be stored using the previously described look-up tables, polynomial coefficients, or interpolated points for use by the microprocessor 78 of the controller 501 of FIG. 17.

Figure 19A:
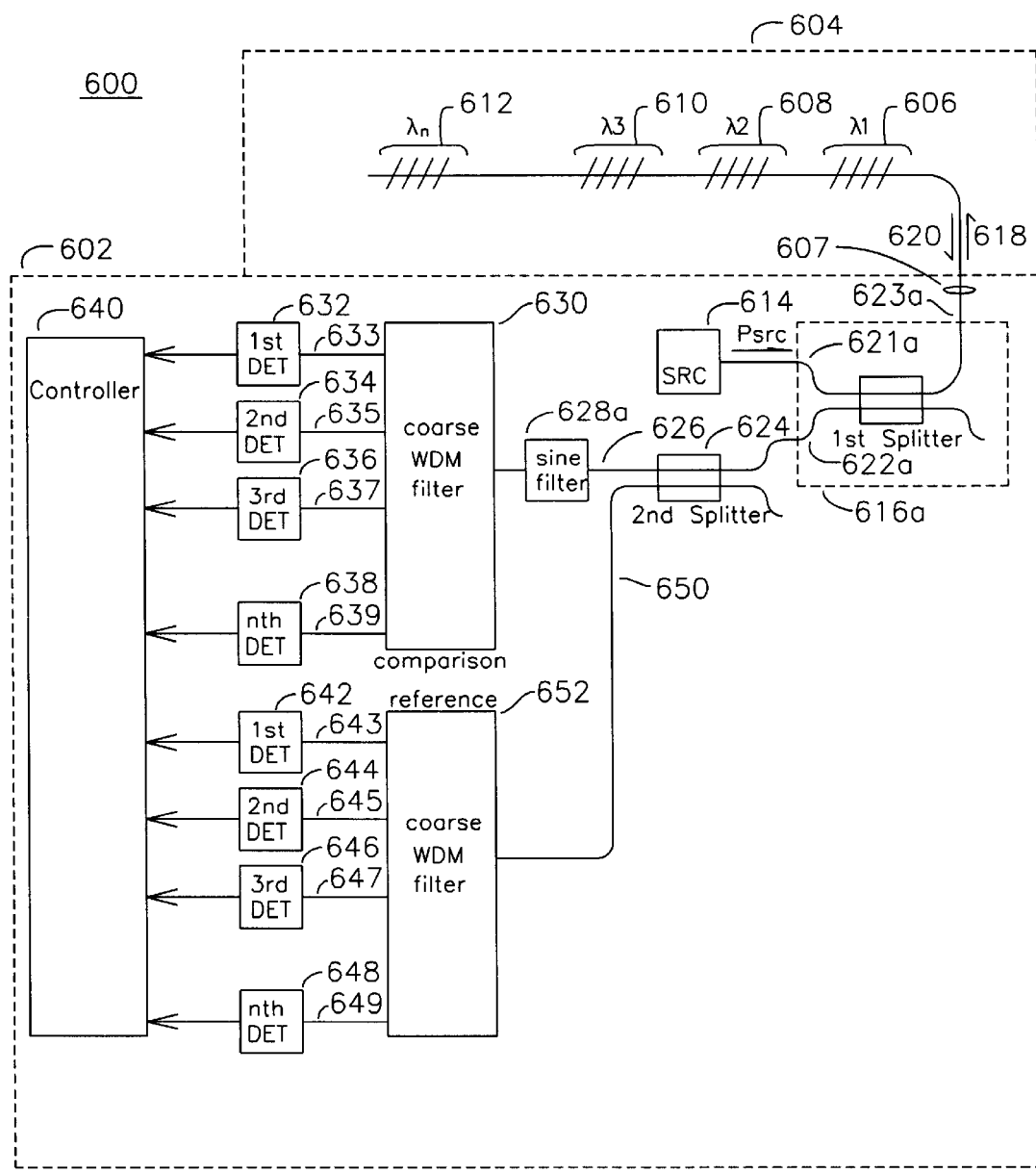
FIG 19a shows the block diagram for a temperature and strain measurement system.

FIG. 19a shows the block diagram for a temperature measurement system 600, comprising a temperature/strain sensor 604, and measurement system 602. FIG. 19a is best understood in combination with FIGS. 20a, 20b, 20c, 20d, and 20e, which show the wavelength specific behavior of the system. For FIGS. 20a through 20f, the x-axis wavelength range is the same for all figures for ease of understanding. Temperature/strain sensor 604 comprises a series of gratings applied to a single fiber, each grating reflecting incoming optical energy at a unique wavelength which defines a wavelength channel, and the wavelength ranges of each grating are chosen such that a single grating operates within a wavelength channel, and no two wavelength channels overlap each other. Wavelength channels are shown in FIG. 20a, 20b, 20c, and 20d as 701, 703, 705, and 707, centered about $\lambda_1$, $\lambda_2$, $\lambda_3$, and $\lambda_n$, respectively, and are common to FIGS. 20a–20d. As can be seen, each grating is operating within its own wavelength channel, and no two gratings are ever reflecting wave energy at the same wavelength. Gratings 606, 608, 610, and 612 are shown as the 4 gratings at wavelengths $\lambda_1$, $\lambda_2$, $\lambda_3$, and $\lambda_n$, respectively, however the number of gratings could be as small as one or two, and as large as the number of wavelength channels which can be supported in the system, and could be greater than many hundreds. As an example of wavelength resolution, where gratings 606 and 608 are operating in adjacent wavelength channels 701 and 703, respectively, the highest wavelength reflected by grating 606 and the lowest wavelength reflected by 608 would be unique and distinguishable, as they are operating in separate wavelength channels. In addition, a depolarizer 607 may be placed in series with the optical path by putting the depolarizer either in the measurement sensor 604, or in the measurement system 602. The function of the depolarizer 607 is to remove any polarization provided by the source 614, or the reflected optical energy of the gratings 606, 608, 610, 612 of the sensor 604. The depolarizer 607 may be placed in series anywhere in the return optical path 622a, 622b, or individually at 628 and 650, however the placement on 623a or 623b provides two-way depolarization, and is believed to be the best mode of the invention. Optionally, the depolarizer may be either present or absent from the system in the locations provided. One source of depolarizer is the IDP series from Alliance Fiber Optic Products of Sunnyvale, Calif.

Figure 20A:
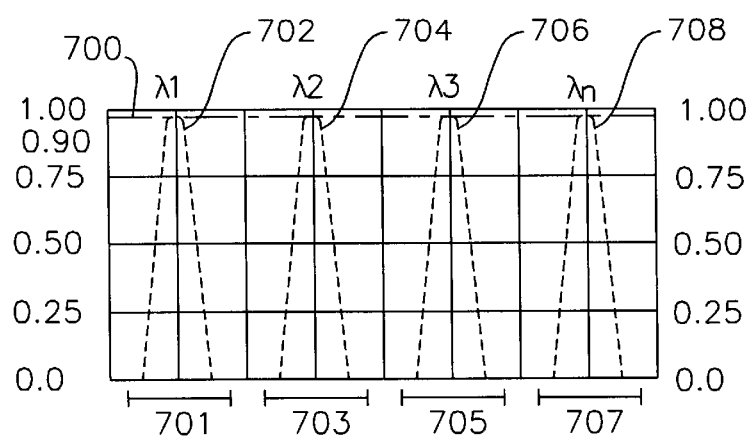
FIGS. 20a, 20b, 20c, 20d, 20e, and 20f show the spectral graphs of the measurement system of FIG. 19.
Figure 20B:
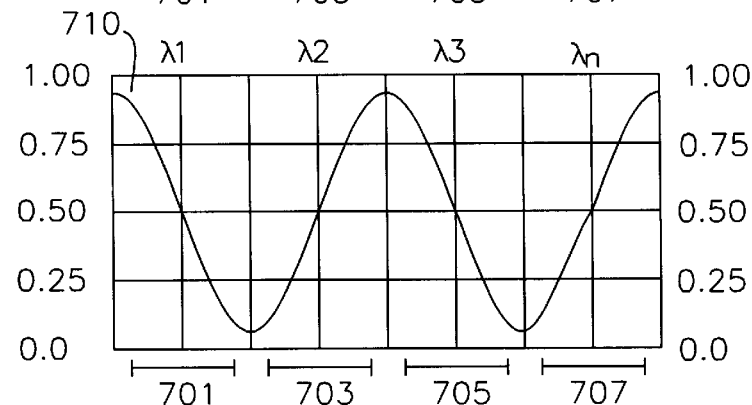

Measurement system 602 comprises a broadband optical source 614 which has optical output which covers all wavelength channels of the sensors 606 through 612. The broadband nature of this source is shown as the curve 700 of FIG. 20a, which does not vary with wavelength in the best mode, although a wavelength-dependant wavelength source could be used. The number of sensors supported is determined by the number of wavelength channels and the wavelength bandwidth of each channel. Hence the source 614 must provide optical energy of sufficient bandwidth to cover all of these channels, although the variation of optical output versus wavelength within a single channel need not be carefully controlled, as will be seen. Broadband optical energy leaving source 614 travels to a first splitter 616, which provides optical energy 618 to the temperature-strain sensor assembly 604. Narrowband optical energy 620 reflected by each sensor is then delivered back to first splitter 616, where it divides evenly into a reference path 650 and a comparison path 626. In one embodiment, the two paths 650 and 626 represent evenly divided optical energy from the output 622 of first splitter 616, however it is possible to accommodate splitter distributions other than 50:50, such as 60:40, etc. Sine filter 628a is coupled on path 626 to the comparison output of second splitter 624, and the sine filter 628a has the characteristic of operating over each wavelength channel, producing an output which is either minimal or maximal at one end of the wavelength channel and maximal or minimal, respectively, at the other range of the wavelength channel. This transfer function reverses and repeats for each wavelength channel over the entire range of operation of the measurement system. Curve 710 of FIG. 20b shows the transfer function of the sine filter, which has an output amplitude which varies with wavelength. The transfer function behavior is periodic over two adjacent wavelength channels. There are two coarse WDM (wavelength division multiplex) filters 630 and 652, which in the best mode have identical filtering characteristics, where this filtering characteristic is to provide coarse separation of wavelength output based on wavelength channel. There are as many outputs for each coarse WDM filter 630 and 652 as there are n wavelength channels in the system.

Figure 19B:
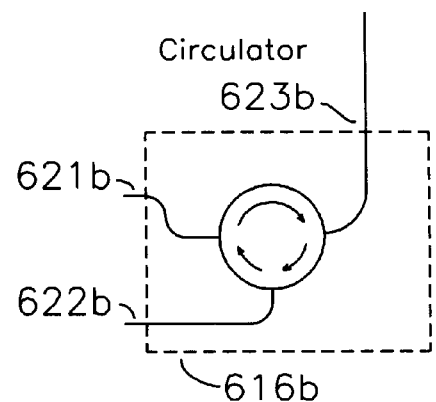
Figure 19C:
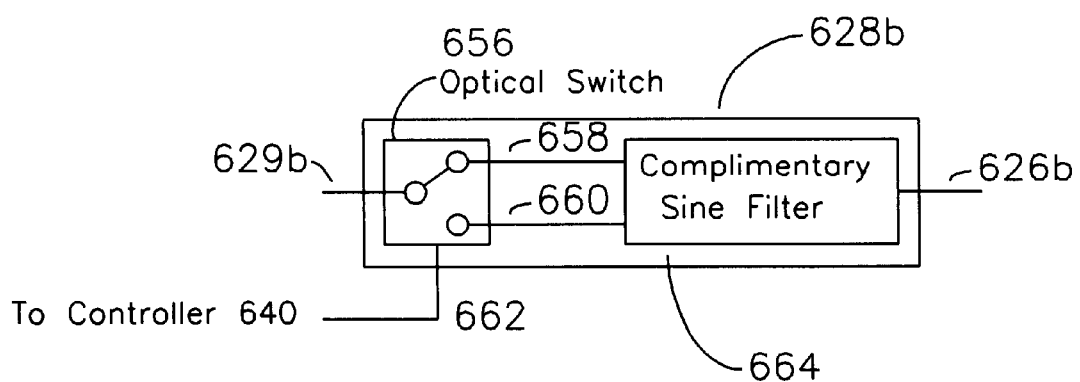
Figure 20C:
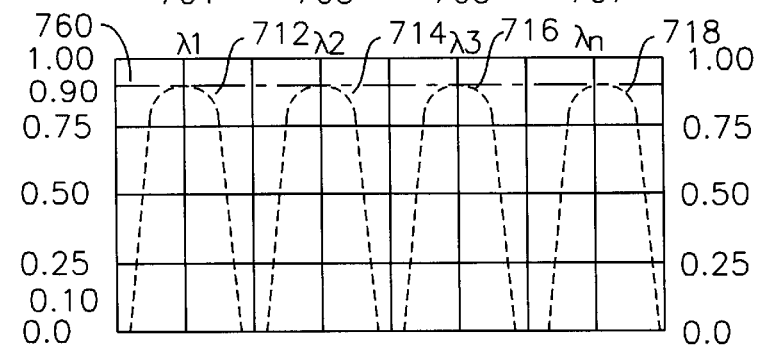

FIG. 20c shows the transfer function for each coarse WDM filter. For illustration and in understanding the operation of the coarse WDM filter, when a broadband source is applied to the WDM filter input, such as source 760, each output produces output wavelengths specific to a particular wavelength channel. For example, outputs 633 and 643 of FIG. 19 could filter and provide exclusively wavelength channel 1 optical response of sensor 606. Since coarse WDM filter 662 is acting only on optical energy without the effect of the sine filter 628a, it provides a reference output constant with wavelength, while the comparison WDM filter 652 provides an output which includes the effect of the sine filter 628a and varies with wavelength. Outputs 635 and 645 would exclusively provide the wavelength channel 2 optical response of sensor 608, and analogous behavior would be shown by outputs 637, 647, 639, and 649, and sensors 610 and 612 respectively. Each comparison and reference WDM filter has an output associated with a particular wavelength channel, and each WDM filter output is coupled to an optical detector, which converts an optical input to an electrical output. Each such reference and comparison detector forms a detector pair operating within each wavelength channel. A controller 640 is coupled to each detector electrical output, and reads the detector outputs in pairs. In the example system of FIG. 19, wavelength channel one pair responsive to sensor 606 could be reference detector 642 and comparison detector 632. Other reference and comparison detector pairs for sensors 608, 610, and 612 are 644 & 634, 646 & 636, and 648 & 638 respectively.

Figure 20D:
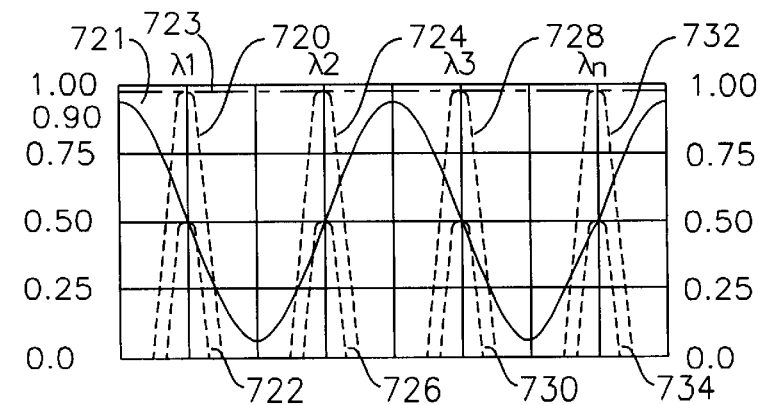

FIG. 20d shows the optical energy provided to each WDM filter, and the outputs produced by each detector. Reflected optical energy 620 has been transferred through first splitter 616 to second splitter 624 via path 622, and is divided evenly between sine filter 628a, which provides filtered optical energy to comparison WDM filter 630 and reference WDM filter 652. First reference detector 642 receives reference optical energy 720, which represents energy reflected by grating 606. The sine filter transfer function of sine filter 628a is shown as curve 721 of FIG. 20d. Comparison detector 632 receives filtered optical energy, shown by curve 722. As was described in earlier figures, the ratio of power between comparison detector 642 exposed to optical power 722 and reference detector 632 exposed to optical power 723 forms a monotonically varying factor which may be used to formulate a mathematical relationship between temperature or strain. This translation between detector power ratio and wavelength/strain may be done in controller 640 using a best-fit curve, or a look-up table, or any other method known to one skilled in the art. Curve 20d also shows wavelength channel 703 responding to sensor 608 and having reference detector response 724 with comparison detector response 726, wavelength channel 705 responding to sensor 610 and having reference detector response 728 and comparison detector response 730, and wavelength channel 707 responding to sensor 612 and having reference detector response 732 and comparison detector response 734.

Figure 20E:
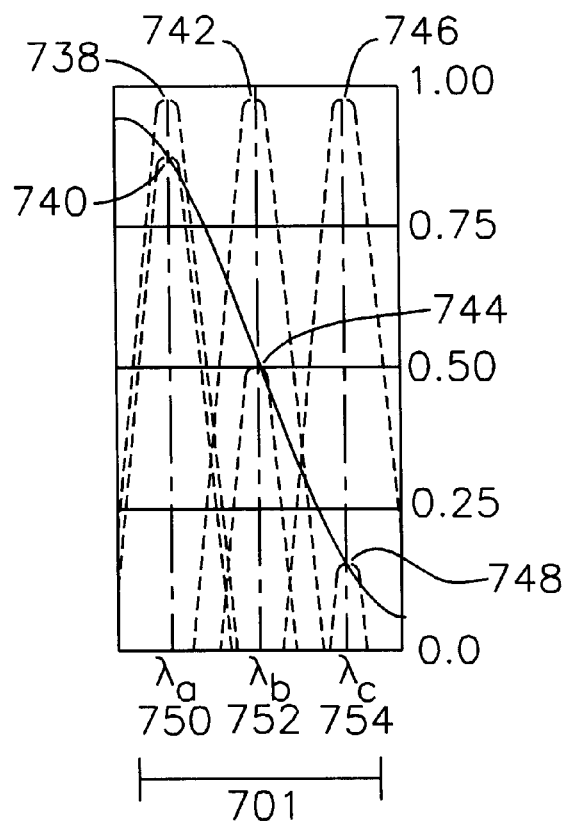
Figure 20F:
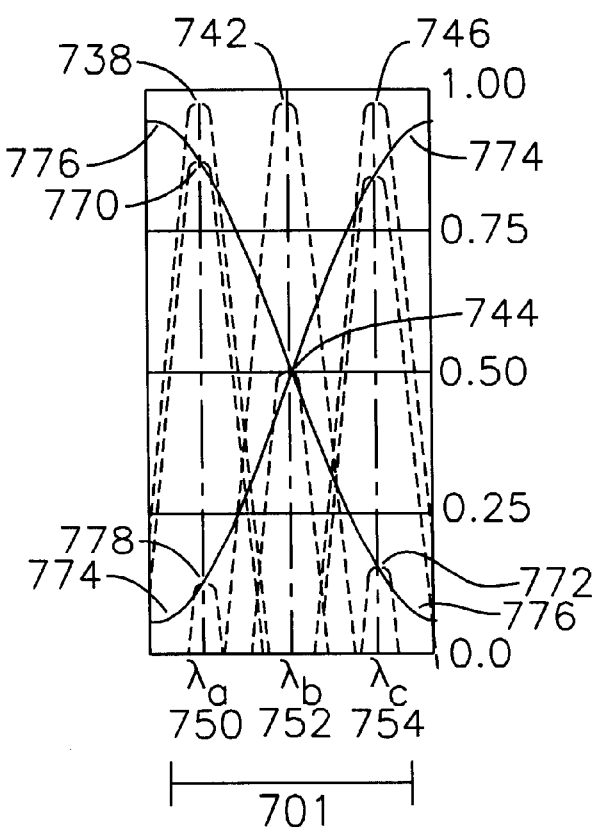

FIG. 20e shows the operation of a single sensor 606 operating in wavelength channel 701. At the center of the range 752, there is a wavelength $\lambda b$ reflected by the sensor 606 where the reference detector 642 provides an output based on response to 742 from the reference WDM filter, and comparison detector 632 provides an output based on response to 744 from the comparison WDM filter. The ratio of comparison detector to reference detector is roughly 0.5 for wavelength $\lambda b$. As either the strain increases or temperature rises on sensor 606, the grating pitch increases, thereby increasing the sensor wavelength of reflection to 754 $\lambda c$, and producing reference detector input 746 and comparison detector input 748, which produces a ratio of comparison detector to reference detector of roughly 0.125 for λc. When either the strain decreases or temperature reduces on sensor 606, the grating pitch decreases, thereby reducing the wavelength of response to 750 λa, and producing reference detector input 738 and comparison detector input 740, which produces a ratio of comparison detector to reference detector of roughly 0.85 for λa. In this manner, the ratio of comparison detector to reference detector is computed, and this ratio is used to produce either a temperature or a strain for the associated sensor. Each sensor operates independently of the other sensors, so the sensors may be placed in any location or in any order on the sensor assembly 604. While the system is shown for four sensors, it is clear to one skilled in the art that the system may be reduced to one or two sensors, or expanded to hundreds of sensors based on the description and figures disclosed herein.

FIG. 19*b* shows circulator 616*b* which can be used in place of first splitter 616*a*, where the port functions and mappings are identical to those shown in FIG. 19*a*. Circulator 616*b* accepts an optical signal on port 621*b* and delivers it to port 623*b*. Reflected energy returning on port 623*b* is directed to port 622*b*, and continues on to the measurement system, as was detailed in FIG. 19*a*. The first splitter 616*a* of FIG. 19*a* exhibits a 3 db loss from 621*a* to 623*a*, and an additional 3 db loss from 623*a* to port 622*a*, so the overall insertion loss is in excess of 6 db. The circulator 616*b* exhibits a 1 db port to port insertion loss, so the overall insertion loss is only 2 db, and is less than the 3 db per path insertion loss of the previously described splitter 616*a*.

FIG. 19*c* shows a calibrating sine filter 628*b* which replaces the sine filter 628*a* of FIG. 19*a*. The purpose of the sine filter with complementary outputs is to characterize the background broadband reflections of the sensors through the calibration process. These reflections produce sensor-dependant background levels of optical energy, which appear as DC offsets in the detectors. The system of FIG. 19*a* is susceptible to variations in the offset values produced by the detector 632, 634, 636, 638 compared to their complementary counterparts 642, 644, 646, 648. A detector offset between the complementary detector pair 632 and 642, for example, would result in an error in computation of power ratio as described earlier. One means of correcting for this would be to periodically switch the sine filter 628*a* from the input of wdm filter 630 to the input of wdm filter 652. An alternate method is to use the complementary sine processor 628*b*. In the embodiment shown in FIG. 19*c*, input 626*b* is split into sine output and sine complementary outputs 658 and 660 respectively by complementary sine filter 664, which has a complementary response which varies with wavelength according to FIG. 20*f* curves 776 and 774, respectively. Optical switch 656 selects between outputs 658 and 660 according to a signal provided by the controller 640, and delivers the selected signal to the coarse wdm filter 630. When the switch selects output 658, the operation is the same as using sine filter 628*a*. However, when the switch selects output 660, offsets associated with the detectors 632, 634, 636, 638 coupled to wdm filter 630 may be determined and cancelled.

The system is also resistant to variation in system components. For example, since the wavelength is computed from a power ratio, variations in source power over time, temperature, or wavelength are normalized out of the computed ratio. Specific characteristics of the second splitter and sine filter may be stored as values specific to a single measurement system to accommodate a wide range of splitters and sine filters. While the system is shown for an embodiment of 4 sensors, it is clear that the system can be expanded or reduced to an arbitrary number of sensors. In general, for a system with n sensors, there are n gratings applied to sensor 604, and the reference and comparison WDM filters have n outputs coupled to n detector pairs. Each sensor and WDM filter operates in its own unique wavelength channel, and the sine filter transmission response in each of these channels is single valued, which is to say it is either monotonically increasing or monotonically decreasing across the wavelength range of a single wavelength channel.

We claim:

1. A fiber-optic sensor system comprising: a sensor assembly, said sensor assembly comprising a plurality n of gratings applied to a single fiber, said sensor assembly having a single port, said sensor assembly port returning optical energy in a wavelength unique to each said n grating when optical energy is applied to said single port:
   a sensor controller comprising:
      a broadband optical source coupled to a first splitter, said first splitter having a sensor port, a measurement port, and a source port coupled to said broadband source, said first splitter coupling optical power from said broadband source to said sensor port, and coupling optical power from said sensor port to said measurement port;
      a second splitter having an input port, a comparison port, and a reference port, optical power applied to said input port splitting between said comparison port and said reference port, said second splitter input port coupled to said first splitter measurement port;
      a sine filter having an input port and an output port, the transfer function of said sine filter being an attenuation function which varies periodically over a range of wavelengths, said sine filter coupled to said second splitter comparison port;
      a reference WDM filter and a comparison WDM filter, each said WDM filter having an input port and a plurality said n of output ports, each said output port responsive to a wavelength associated with each said n sensor, said comparison WDM filter input coupled to said sine filter output, and said reference WDM filter input coupled to said second splitter reference port;
      a plurality said n of detector pairs, each said detector pair coupled to said reference WDM filter output port and said comparison WDM filter output port and providing a reference output and comparison output for each said sensor;
      a controller coupled to each said n plurality of detector pairs, converting a reference output and comparison output into an associated sensor measurement for each said n plurality of detector pairs.

2. The fiber-optic sensor system of claim 1 where said first splitter is an optical splitter having a pair of first ports and a pair of second ports, whereby optical energy coupled to either of said splitter first ports divides evenly into said pair of second ports, and energy coupled to either of said splitter second ports divides evenly between said splitter first ports.

3. The fiber-optic sensor system of claim 2 where the optical energy removed from at least one of said second ports is at least 3 db lower than the optical energy applied to said first port.

4. The fiber-optic sensor system of claim 2 where the optical energy removed from at least one of said first ports is at least 3 db lower than the optical energy applied to said second port.

5. The fiber-optic sensor system of claim 1 where said first splitter is an optical circulator having a first port for the introduction of first optical energy, a second port for the introduction of second optical energy, said second port also removing said first optical energy applied to said first port, and a third port for removal of said second optical energy applied to said second port.

6. The fiber-optic sensor system of claim 5 where the optical path loss from said first port to said second port is less than 3 db.

7. The fiber-optic sensor system of claim 5 where the optical path loss from said second port to said third port is less than 3 db.

8. a fiber-optic sensor system comprising: a sensor assembly, said sensor assembly comprising a plurality n of gratings applied to a single fiber, said sensor assembly having a single port, said sensor assembly port returning optical energy in a wavelength unique to each said n grating when optical energy is applied to said single port;

a sensor controller comprising:

a broadband optical source coupled to a first splitter, said first splitter having a sensor port, a measurement port, and a source port coupled to said broadband source, said first splitter coupling optical power from said broadband source to said sensor port, and coupling optical power from said sensor port to said measurement port;

a second splitter having an input port, a comparison port, and a reference port, optical power applied to said input port splitting between said comparison port and said reference port, said second splitter input port coupled to said first splitter measurement port;

a switchable sine filter having:

an input port and an output port, said input port coupled to a complementary sine filter having a sine output and a complementary sine output, said sine output and said complementary sine output having a response which vary in a complementary manner as the wavelength applied to said sine filter input port is varied;

an optical switch having a first selector input coupled to said sine output, a second selector input coupled to said complementary sine output, a selector output coupled to said switchable sine filter output port, and a control input which causes said selector output to couple to either said sine filter input port or said sine filter complementary sine output port, said sine filter input coupled to said second splitter comparison port;

a reference WDM filter and a comparison WDM filter, each said WDM filter having an input port and a plurality said n of output ports, each said output port responsive to a wavelength associated with each said n sensor, said comparison WDM filter input coupled to said switchable sine filter output, and said reference WDM filter input coupled to said second splitter reference port;

a plurality said n of detector pairs, each said detector pair coupled to said reference WDM filter output port and said comparison WDM filter output port and providing a reference output and comparison output for each said sensor;

a controller coupled to each said n plurality of detector pairs, converting a reference output and comparison output into an associated sensor measurement for each said n plurality of detector pairs, said detector producing an output coupled to said switchable sine filter optical switch control input.

9. The fiber-optic sensor system of claim 8 where said first splitter is an optical splitter having a pair of first ports and a pair of second ports, whereby optical energy coupled to either of said splitter first ports divides evenly into said pair of second ports, and energy coupled to either of said splitter second ports divides evenly between said splitter first ports.

10. The fiber-optic sensor system of claim 8 where the optical energy removed from at least one of said second ports is at least 3 db lower than the optical energy applied to said first port.

11. The fiber-optic sensor system of claim 8 where the optical energy removed from at least one of said first ports is at least 3 db lower than the optical energy applied to said second port.

12. The fiber-optic sensor system of claim 8 where said first splitter is an optical circulator having a first port for the introduction of first optical energy, a second port for the introduction of second optical energy, said second port also removing said first optical energy applied to said first port, and a third port for removal of said second optical energy applied to said second port.

13. The fiber-optic sensor system of claim 8 where the optical path loss from said first port to said second port is less than 3 db.

14. The fiber-optic sensor system of claim 8 where the optical path loss from said second port to said third port is less than 3 db.

15. The fiber-optic sensor system of claim 1 where said first splitter includes a depolarizer filter placed in series with said first splitter sensor port.

16. The fiber-optic sensor system of claim 8 where said first splitter includes a depolarizer filter placed in series with said first splitter sensor port.

* * * * *